US008626600B2

(12) United States Patent
Yankovich et al.

(10) Patent No.: US 8,626,600 B2
(45) Date of Patent: Jan. 7, 2014

(54) PERSONALIZED ITEM TRADING CARD GENERATION AND MANAGEMENT

(75) Inventors: Steve Yankovich, San Jose, CA (US); Ryan Melcher, Ben Lomond, CA (US); Robert Veres, Los Gatos, CA (US)

(73) Assignee: eBay Inc., San Jose, CA (US)

( * ) Notice: Subject to any disclaimer, the term of this patent is extended or adjusted under 35 U.S.C. 154(b) by 167 days.

(21) Appl. No.: 13/233,192

(22) Filed: Sep. 15, 2011

(65) Prior Publication Data

US 2013/0073435 A1 Mar. 21, 2013

(51) Int. Cl.
*G06Q 30/00* (2012.01)

(52) U.S. Cl.
USPC ....... 705/26.1; 705/7.29; 705/7.31; 705/7.35; 705/26.41

(58) Field of Classification Search
USPC .............................. 705/7.29–7.35, 26.1–27.2
See application file for complete search history.

(56) References Cited

U.S. PATENT DOCUMENTS

| | | | |
|---|---|---|---|
| 7,613,633 B1 | 11/2009 | Woolston | |
| 7,720,722 B2 | 5/2010 | Ho et al. | |
| 2004/0128224 A1 | 7/2004 | Dabney et al. | |
| 2007/0187266 A1 | 8/2007 | Porter et al. | |
| 2008/0065514 A1* | 3/2008 | Eaton | 705/27 |
| 2009/0327047 A1 | 12/2009 | Sussman | |
| 2010/0179857 A1* | 7/2010 | Kalaboukis et al. | 705/10 |
| 2011/0016025 A1* | 1/2011 | Gaisford | 705/27.1 |
| 2011/0099091 A1* | 4/2011 | Woolston | 705/27.1 |
| 2011/0112869 A1* | 5/2011 | Greak | 705/4 |
| 2011/0125867 A1 | 5/2011 | Denk, Jr. | |
| 2011/0173095 A1 | 7/2011 | Kassae et al. | |
| 2012/0072256 A1* | 3/2012 | Baghdassarian | 705/7.24 |
| 2012/0109773 A1* | 5/2012 | Sipper et al. | 705/26.3 |
| 2012/0150691 A1* | 6/2012 | Woolston | 705/26.61 |
| 2012/0248196 A1* | 10/2012 | Wang | 235/472.01 |

OTHER PUBLICATIONS

WWW.WHAT-IS-WHAT.COM. Jan. 31, 2009 to Feb. 1, 2009 [recovered from www.Archive.org].*

* cited by examiner

*Primary Examiner* — William Allen
(74) *Attorney, Agent, or Firm* — Haynes and Boone, LLP (57) ABSTRACT

Methods and systems to generate and manage an item trading card are provided. A method may include providing an interface to access an item trading card associated with an item, and generating the item trading card including an item identifier associated with the item, a trading card identifier associated with the trading card, item data about the item, and market data about the item. The method further includes sharing the item trading card.

20 Claims, 9 Drawing Sheets

PERSONALIZED ITEM TRADING CARD GENERATION AND MANAGEMENT

TECHNICAL FIELD

The present application relates generally to the technical field of data processing and, in one specific example, to systems and methods for personalized item trading card generation and management.

BACKGROUND

Consumers and their family members possess various goods for personal use and/or desire to possess various goods for personal use. In some circumstances, a consumer may maintain an inventory of these goods for sale, purchase, or simply as a so-called "wish list". It is desirable to provide systems and methods for easily allowing the generation, management, and/or sharing of such an inventory.

BRIEF DESCRIPTION OF THE DRAWINGS

Some embodiments are illustrated by way of example and not limitation in the figures of the accompanying drawings as described below.

DETAILED DESCRIPTION

It is understood that the following disclosure provides many different embodiments, or examples, for implementing different features of the disclosure. Specific examples of components and arrangements are described below to simplify the present disclosure. These are, of course, merely examples and are not intended to be limiting. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Various features may be arbitrarily drawn in different scales for the sake of simplicity and clarity. It is noted that the same or similar features may be similarly numbered herein for the sake of simplicity and clarity. In addition, some of the drawings may be simplified for clarity. Thus, the drawings may not depict all of the components of a given apparatus (e.g., device) or method.

Various aspects of the present disclosure will be described herein with reference to drawings that are schematic illustrations of idealized configurations of the present disclosure. As such, variations from the shapes of the illustrations as a result, for example, manufacturing techniques and/or tolerances, are to be expected. Thus, the various aspects of the present disclosure presented throughout this disclosure should not be construed as limited to the particular shapes of elements (e.g., regions, layers, sections, substrates, etc.) illustrated and described herein but are to include deviations in shapes that result, for example, from manufacturing. By way of example, an element illustrated or described as a rectangle may have rounded or curved features and/or a gradient concentration at its edges rather than a discrete change from one element to another. Thus, the elements illustrated in the drawings are schematic in nature and their shapes are not intended to illustrate the precise shape of an element and are not intended to limit the scope of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

It will be understood that although the terms "first", "second", "third", and so on, may be used herein to describe various elements or devices, the elements or devices should not be limited by these terms. These terms are only used to distinguish one element or device from another element or device. Thus, a first element or device discussed below could be termed a second element or device without departing from the teachings of the present disclosure.

It is understood that several processing steps and/or features of a device may be only briefly described, such steps and/or features being well known to those of ordinary skill in the art. Also, additional processing steps or features can be added, and certain of the following processing steps or features can be removed and/or changed while still implementing the claims. Thus, the following description should be understood to represent examples only, and are not intended to suggest that one or more steps or features is required.

Example methods and systems to generate, mange, and/or share an inventory are described. In the following description, for purposes of explanation, numerous specific details are set forth in order to provide a thorough understanding of example embodiments. It will be evident, however, to one skilled in the art that the present disclosure may be practiced without these specific details.

An inventory system is to generate and maintain an inventory of a consumer's belongings or desired items, including, for example, fungible products and collectibles, organized as item trading cards in one example. The inventory may include a list of items, a description of at least a portion of the respective items belonging to the consumer or desired by the consumer, a quantity of each item owned or desired by the consumer, and a market value of each item. The inventory, as used herein, is defined as a list of items and associated description of the items that a particular consumer or set of consumers possesses, desires to possess (e.g., as a potential purchase item or as a "wish list" or "wish item"), and/or desires to share with other consumers or users. The inventory may include at least a partial description of at least a portion of the items. The inventory may be augmented with market data for certain items. The consumers may include users of the inventory system, people identified by the user, or business entities, such as the nodes of a user's social network (e.g., Facebook, LinkedIn, etc.).

In one example, the inventory system may generate, manage, and/or share items organized as item trading cards, with each item trading card associated with an item. Each item trading card may further include a item identifier associated the item, a trading card identifier associated with the trading card, item data about the item, and market data about the item.

The inventory system may establish an inventory account for the consumer. In some instances, the inventory account may be subdivided into multiple accounts or be associated with other accounts belonging to other consumers. Items and associated item trading cards may be added to the inventory account based on, for example, transactions associated with the consumer, input received from the consumer, or by other operations. For example, a consumer may send a barcode or a quick response (QR) code associated with an item to the inventory system for generating an item trading card. In another example, a consumer may send a unique barcode associated with a vehicle identification number for generating an item trading card associated with that vehicle.

Upon receiving at least a partial identification of an item, the inventory system may collect additional item data from a plurality of sources, including the consumer, and update an item description in the item trading card. In the case of the item being a fungible good, the item trading card in the inventory may be updated based on catalog data associated with the fungible good.

The inventory system may collect market data for the respective items in the inventory. The market data may include a current market value for an item in inventory based on recent transactions, availability notes, or information about events that may affect the value of the item. The market data, along with a description of the item, may be displayed on the item trading card to the consumer via a user interface.

Figure 1:
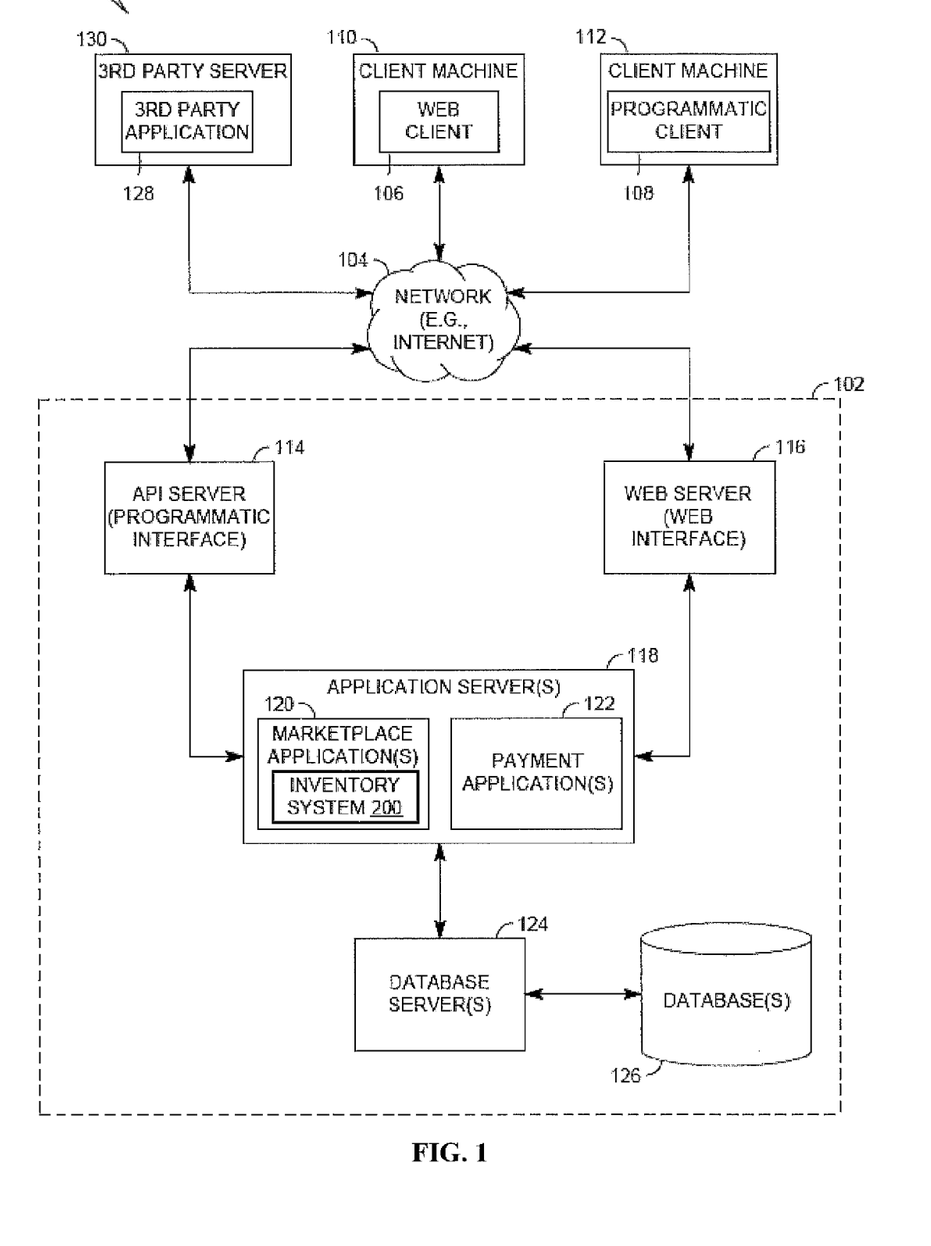
FIG. 1 is a network diagram depicting a client-server system, within which one example embodiment may be deployed.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet, a Wide Area Network (WAN), or a local area network (LAN)) to one or more clients. FIG. 1 illustrates, for example, a web client 106 (e.g., a browser, such as the Internet Explorer browser developed by Microsoft Corporation of Redmond, Wash. State), and a programmatic client 108 executing on respective client machines 110 and 112.

The network 104, in one embodiment, may be implemented as a single network or a combination of multiple networks. For example, the network 104 may include a wireless telecommunications network (e.g., cellular telephone network) adapted for communication with one or more other communication networks, such as the Internet. In other examples, the network 104 may include the Internet, one or more intranets, landline networks, wireless networks, and/or one or more other appropriate types of communication networks.

The client machines 110 and 112, in various embodiments, may each be implemented using any appropriate combination of hardware and/or software configured for wired and/or wireless communication over the network 104. In one embodiment, the client machines 110 and 112 may each be implemented as a mobile communication device (e.g., wireless cellular phone) adapted for communication with the network 104. In other embodiments, the client machines 110 and 112 may each be implemented as a personal computer (PC), a personal digital assistant (PDA), a notebook computer, and/or various other generally known types of wired and/or wireless computing devices for communication with the network 104. It should be appreciated that the client machines may be referred to as a client device or a customer device without departing from the scope of the present disclosure.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users that access the networked system 102 and may include an inventory system 200. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, embodiments are not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third-party application 128, executing on a third-party server machine 130. In one example, third-party server machine 130 may have programmatic access to the networked system 102 via the programmatic interface provided by the API server 114. For example, the third-party application 128 may, utilizing information retrieved from the networked system 102, support one or more features or functions on a website hosted by the third party. The third-party website may, for example, provide one or more promotional, marketplace or payment functions that are supported by the relevant applications of the networked system 102. In other examples, the third-party application 128 on third party server machine 130 may provide a social network (e.g., Facebook, LinkedIn, etc.) with contacts or nodes with whom item trading cards may be shared by a user.

Figure 2:
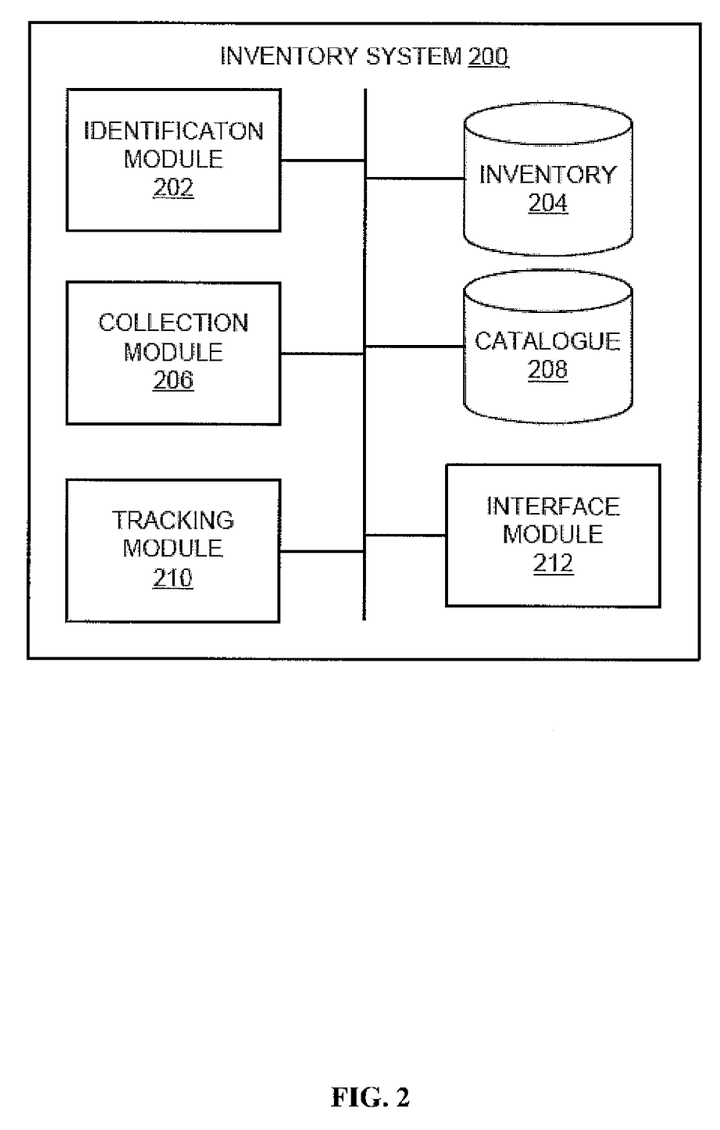
FIG. 2 is a block diagram of an inventory system according to at least one embodiment.

FIG. 2 is a block diagram of an inventory system 200 according to at least one embodiment. The inventory system 200 may be implemented in hardware, software, or a combination thereof. The inventory system 200 is configured to generate an inventory including at least one item trading card (typically a plurality of item trading cards) and maintain the inventory for at least one consumer (typically a plurality of consumers). For simplicity, the inventory system 200 is described as generating a single inventory for a single consumer. It is understood that the inventory system may generate and maintain multiple inventories for multiple consumers. The identification of a particular inventory is discussed in greater detail in connection with FIG. 3.

Upon receiving an identification of a particular inventory maintained by the inventory system 200, an identification module 202 is configured to receive an indication that the consumer possesses, owns, plans to purchase, or desires a particular item. The indication may be a record that the consumer has purchased the item using the marketplace application 120, a universal product code (UPC) or quick response (QR) input (or other bar code) from a camera or optical scanner, a selection of the item by the consumer via a user interface, a picture of the item received from the consumer, text received from the consumer, or by other data collected about or by the consumer. In some embodiments, the consumer may scan a bar code printed on a receipt that identifies multiple items purchased by the consumer at a point of sale (POS) system in a store. Other identifiers, such as vehicle identification numbers (VINs) or serial numbers, may be provided by the consumer.

In some instances, search terms saved by the user or used repeatedly by the user may be identified and associated with a particular item owned or desired to be purchased by the consumer. For example, if the saved searches include various car parts for a 1987 Nissan truck, the identification module 202 may determine that the consumer owns or desires to purchase a 1987 Nissan truck. In these instances, the identification module 202 may send a confirmation message to the consumer to confirm that the consumer does, in fact, own or desires to purchase the 1987 Nissan truck.

The indication received by the identification module 202 may or may not include a complete description of the item. Upon receiving the indication, the identification module 202 stores the indication and as complete a description as known in an inventory 204. The inventory 204 stores and makes available the indications of the items of the consumer. In one example, the description of the item may be stored as an initial item trading card in the inventory 204 and used as a basis for additional item data (e.g., vehicle performance and mechanical specifications) and/or item market data (e.g., vehicle sale prices, lowest prices, etc.) to generate a subsequent item trading card. In other examples, item data may be stored in inventory 204 and used for an item trading card subsequently assembled and displayed via interface module 212.

In some instances, the identification module 202 is further configured to manage a wish list associated with the consumer. The wish list includes at least a portion of a description of one or more items that the consumer desires or plans to purchase (or have purchased for the consumer) at some point in the future. The identification module 202 may access the inventory 204 to complete a description of an item on the wish list. For example, if the inventory 204 includes a description of a 1987 Nissan truck and the consumer has added "windshield wipers" to his wish list, the identification module 202 (or the collection module 204, discussed below), may include the windshield wipers on the wish list as being "windshield wipers for a 1987 Nissan truck." In some instances, a product code or part number for appropriate windshield wipers may be determined and added to the wish list. In one example, one or more items of a wish list may be described, displayed, or linked on an existing item trading card with an associated item (e.g., on an existing item trading card for the 1987 Nissan truck) or on a newly created item trading card which is or is not associated with another existing item trading card.

The collection module 206 is configured to collect additional details about an item (also referred to as additional "item data") or related items and/or to confirm an identity of an item. The additional details about an item may be collected from multiple sources such as manufacturers, retailers, distributors, media sources, consumers, and experts. The item may be a fungible good identifiable by a UPC scanned by the consumer or may be a rare collectible identifiable by experts. To populate descriptions of particular items, particularly a fungible good, the collection module 206 may access a catalog 208. The catalog 208 may include at least one table that includes descriptions or specifications known about the fungible good. A fungible good in a particular inventory 204 may include a pointer to the catalog 208. For rare items or items that are not included in the catalog 208, the collection module 206 may store the additional details in the inventory 204. In instances where the consumer purchased the item using a marketplace application 120, the item description published by a seller during the sale of the item may be used to populate the description of the purchased item. In one example, the additional item data which is collected by collection module 206 may be described, displayed, or linked on an existing item trading card with an associated item (e.g., vehicle performance and mechanical specifications for an existing vehicle trading card).

A tracking module 210 is configured to collect market data about the items in the inventory 204. The market data may be collected from one or more resources including transaction data in an online marketplace and/or third party websites (e.g., from a third party server machine 130). Other sources of data include published pricelists, market data for substantially the same or similar items, and various other market data sources. The similar items may be complementary (e.g., accessories for a device) or competitive (e.g., replacements for an item). In one example, the item market data which is collected by tracking module 210 may be described, displayed, or linked on an existing item trading card with an associated item (e.g., vehicle sale prices, lowest prices, etc.).

An interface module 212 is to generate a user interface to display the inventory to the consumer. The user interface may include a description of an item or a plurality of items accessed from the inventory and/or the catalog 208 and market data pertaining to the item or items. As noted above, in one example, the user interface may display an item from the inventory in the form of an item trading card as further described below. The interface module 212 may assemble an interface for a set of inventories or an item trading card(s) accessible to the consumer. According to one aspect, item data (e.g., additional item data and/or item market data) may be stored in inventory 204 and used for an item trading card subsequently assembled and displayed via interface module 212. According to another aspect, a basis item trading card may be stored in inventory 204 which may subsequently be updated with additional item data and/or item market data and displayed via interface module 212. In some embodiments, the interface module 212 may communicate with the marketplace applications 120 and the payment applications 122 to provide an option to list a particular item in the inventory (e.g., to list a particular item trading card) for sale in an online marketplace.

In some embodiments, the inventory 204 maintained by the inventory system 200 may be used to provide search results. For example, a search module (not shown) among the marketplace applications 120 may access the inventory 204 (or data about the consumer derived from the inventory 204) to refine search results provided to the consumer in response to a query. For example, if the inventory 204 associated with the consumer includes the 1987 Nissan truck and the consumer enters a query for "windshield wipers," the search module may provide search results directed to windshield wipers for a 1987 Nissan truck. In some embodiments, search results related to a 1987 Nissan truck may be prioritized or featured within the search results provided to the consumer.

In further instances, the inventory 204 may be used to establish social groups of consumers who own similar items. For example, if a number of consumers each own a 1987 Nissan truck, a social group for 1987 Nissan truck owners may be created within a social network. Each consumer who owns a 1987 Nissan truck may be invited to join the social group. The social network may provide a number of features to the members of the social group. These features may include a wall, a forum having a number of chat rooms, profile pages for each member where the member may post images of his 1987 Nissan truck, a buy/sell feature where the member may list 1987 Nissan trucks and related items (e.g., spare parts) for sale or purchase. In one embodiment, inventory system 200 may communicate via interface module 212 with a third party social network to share or transmit or communicate one or more item trading cards to a consumer's contacts or nodes in the consumer's social network. According to one aspect, unique item identifiers and/or unique item trading card identifiers may be shared or transmitted or communicated.

Figure 3:
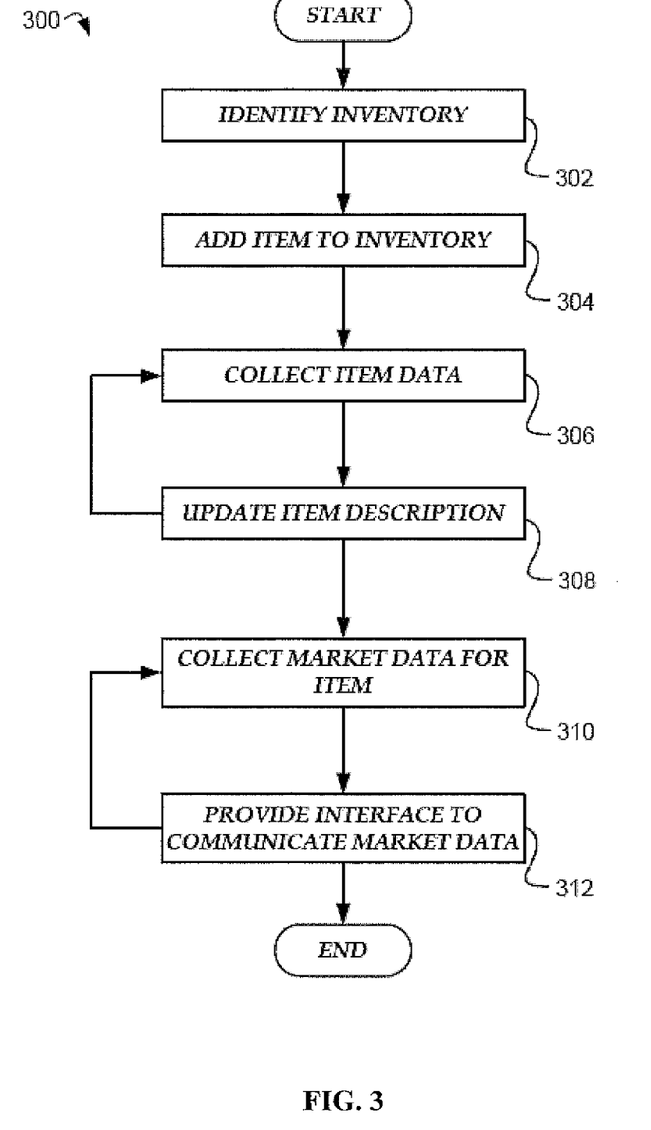
FIG. 3 is a flowchart of a process for generating and managing an inventory according to at least one embodiment.

FIG. 3 is a flowchart of a process 300 for generating and managing a particular inventory in the inventory 204 according to at least one embodiment. The process 300 may at least partially be performed by the inventory system 200.

In an operation 302, the particular inventory within the inventory 204 is identified. The particular inventory may be accessible by one or more consumers. The particular inventory may comprise a set of two or more inventories or be linked to other inventories. For example, the particular inventory may be a family inventory having items divided by family members, for example, a father, a mother, and a child. In other instances, the family inventory may be constructed as a set of linked inventories having permissions. For example, a mother may be able to access a father's inventory and a child's inventory but the child may not have access to his parent's inventories. The permissions may define the ability of a consumer within the family to perform certain tasks such as adding items to an inventory and listing items for sale. For example, a father may be able to list items in the child's inventory for sale but not the mother's items even though the mother's items are visible to the father.

In an operation 304, at least one item is added to an inventory. The addition of the item may be performed as described above in connection with the identification module 202, collection module 206, and/or tracking module 210. The item may have a full or partial description at the time it is added.

In an operation 306, data about the added item may be collected from one or more sources. In an operation 308, the collected data is added to the item description by storing the information in the inventory 204 or the catalog 208. Operations 306 and 308 may be repeated as additional information is collected.

In an operation 310, market data is collected for the item, and in an operation 312, an interface is provided to communicate the market data to the consumer. The operation 310 may be performed upon receiving a request for the interface of operation 312 or may be performed at other times. For fungible goods that may be included in more than one inventory, the market data may be collected continuously or periodically.

Figure 4:
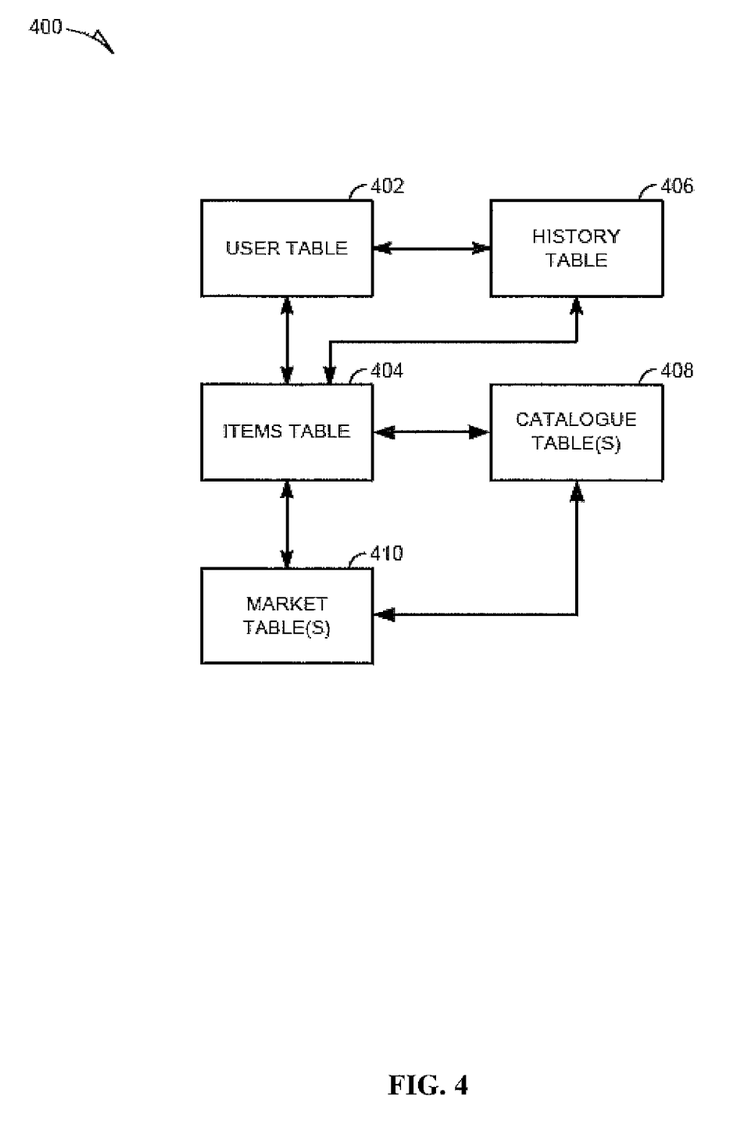
FIG. 4 is a high-level entity-relationship diagram, illustrating various tables that may be maintained within the databases, and that are utilized by and support the inventory system according to at least one embodiment.

FIG. 4 is a high-level entity-relationship diagram, illustrating various tables 400 that may be maintained within the inventory 204 and the catalog 208, and that are utilized by and support the inventory system 200. A user table 402 contains a record for each registered consumer of the networked system 102, and may include identifier, address and financial instrument information pertaining to each such registered consumer. A consumer may operate as a seller, a buyer, or both, within the networked system 102. In one example embodiment, a buyer may be a consumer that has accumulated value (e.g., commercial or proprietary currency), and is accordingly able to exchange the accumulated value for items that are offered for sale by the networked system 102.

The tables 400 also include an items table 404 in which are maintained item records for items in an inventory associated with a consumer. Each record within the items table 404 may furthermore be linked to one or more consumer records within the user table 402, so as to associate a consumer with each item record. In one example, the item records which are maintained in items table 404 may be in the form of partial or complete item trading cards. The item trading cards may be associated with one or more consumers and may be associated with any number of other item trading cards.

A history table 406 maintains a history of transactions to which a consumer has been a party and may be used to identify items possessed or desired to be purchased by the consumer to be included in the inventory. Catalog table 408 records information pertaining to the respective fungible goods for which records exist within the items table 404 (e.g., additional item data). Considering only a single example of information that may be stored in the catalog table 408 for a particular item, a UPC attribute may record the UPC associated with the item. A market table 410 may record market information relating to an item in the items table 404 (e.g., item market data).

Figure 5:
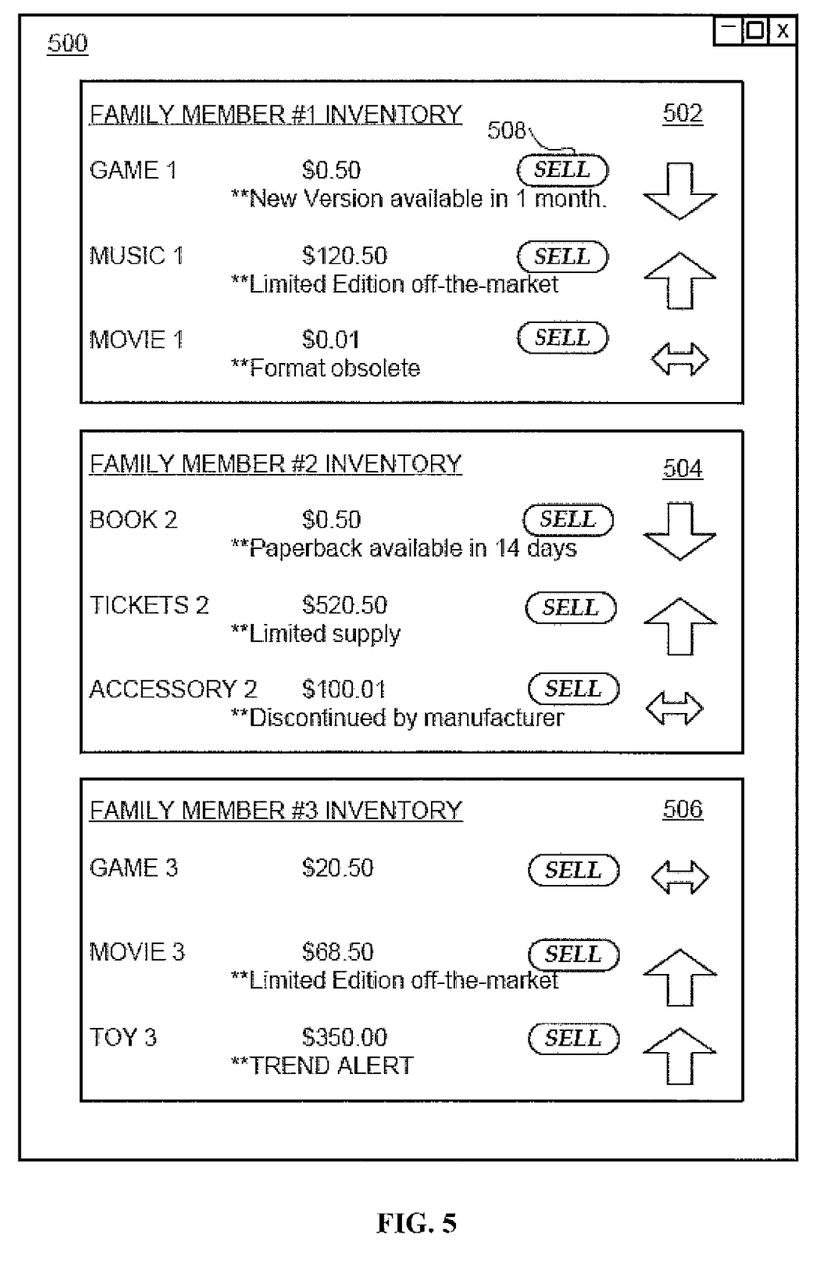
FIG. 5 depicts a portion of an example user interface generated by the inventory system according to an embodiment.

FIG. 5 depicts a portion of an example user interface 500 generated by the inventory system 200. The user interface 500 comprises three example inventories labeled "Family Member #1 Inventory" 502, "Family Member #2 Inventory" 504, and "Family Member #3 Inventory" 506, respectively. For each inventory, a number of short item titles are depicted (e.g., in "Family Member #1 Inventory" 502, "Game 1," "Music 1," and "Movie 1" are shown). The inventory may include longer item descriptions, images, or may link to more detailed information.

For the respective items listed in the inventory, the interface 500 includes market data including an expected resale value. The expected resale value may be based on recent sales and may be calculated as, for example, an average, median, or mode of recent sale prices. A price trend may be indicated to the user graphically, for example by arrows pointing up, down, and sideways. Other graphics may include graphs, charts, or the like. Notations explaining reasons for price trends may be included in the interface 500. The interface 500 may include an option to sell 508 the item in the inventory. Upon selecting the option to sell 508, the item may be listed for sale by the marketplace applications 120.

Figure 6:
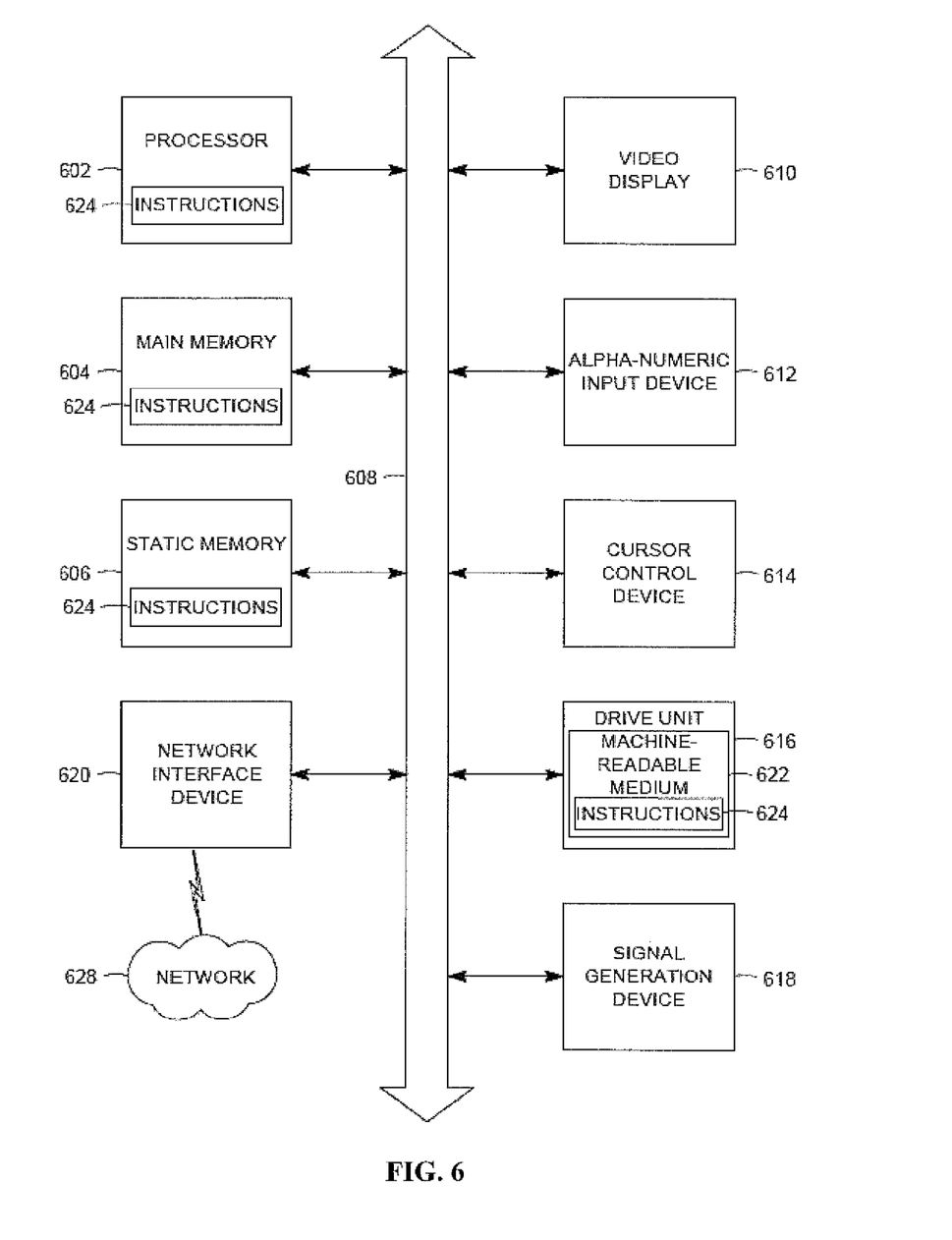
FIG. 6 shows a diagrammatic representation of a machine in the example form of a computer system within which a set of instructions for causing the machine to perform any one or more of the methodologies discussed herein may be executed.

FIG. 6 shows a diagrammatic representation of a machine in the example form of a computer system 600 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620. The computer system 600 may include a touchscreen (not shown).

The disk drive unit 616 includes a machine-readable medium 622 on which is stored one or more sets of instructions 624 (e.g., software) embodying any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media.

The instructions 624 may further be transmitted or received over a network 628 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

Figure 7A:
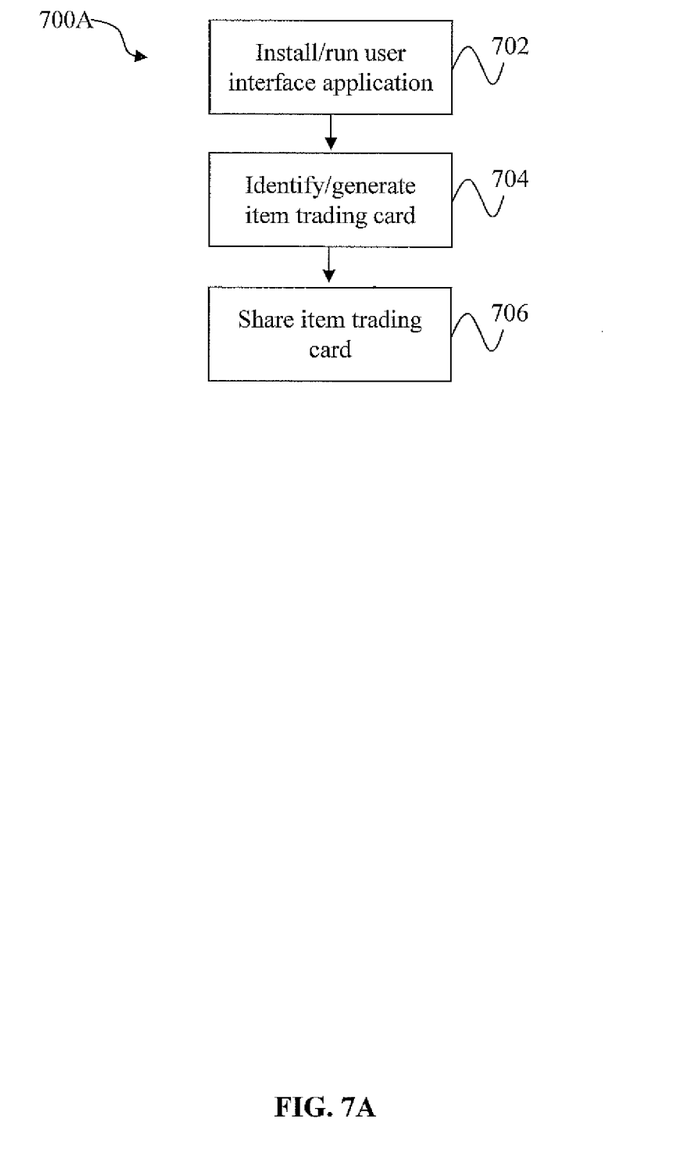
FIGS. 7A and 7B are flowcharts of processes for generating, managing, and/or sharing a personalized item trading card according to at least one embodiment.
Figure 7B:
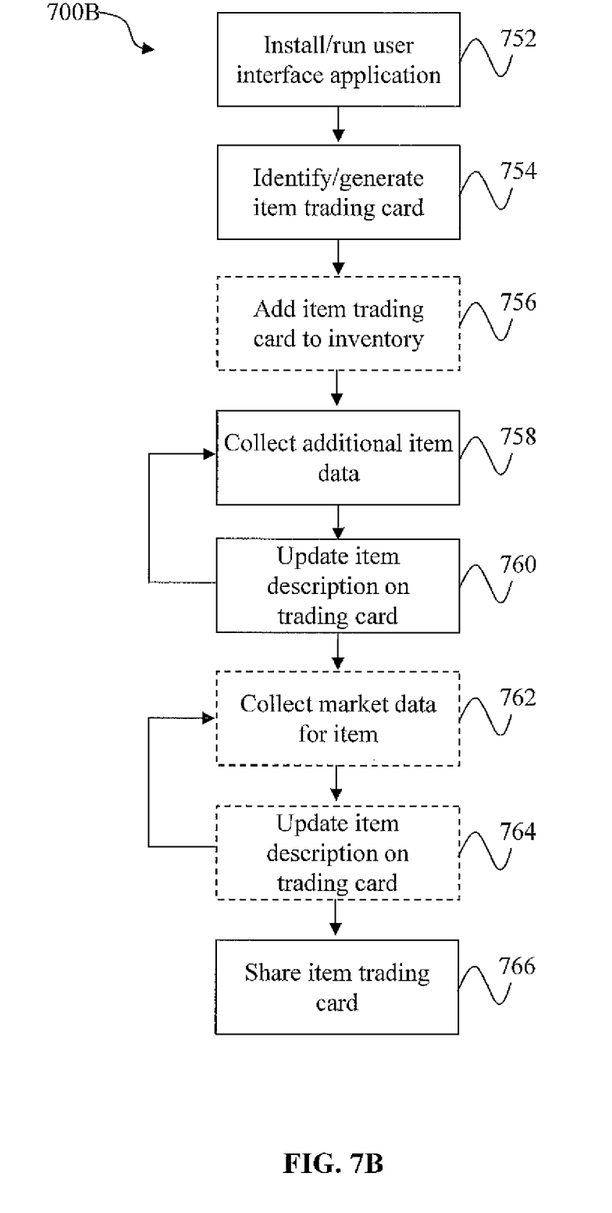

FIGS. 7A and 7B are flowcharts of a process 700A and 700B, respectively, for generating and managing an item trading card (e.g., in the inventory 204) according to at least one embodiment. The processes 700A and 700B may each at least partially be performed by the inventory system 200 in one example.

In process 700A, a user interface is provided in an operation 702 to generate, access, and/or display an item trading card associated with an item. In one example, a user or consumer at a client device (e.g., client machine 110 or 112) may install or run a user interface application for generating, managing, and/or sharing one or more item trading cards. In another example, an application server, marketplace application, or inventory system may provide a user interface to a client device.

In an operation 704, a new item trading card is generated or a previously created item trading card (partial or complete) may be identified. In one example, the item trading card includes an item identifier associated with the item, a trading card identifier associated with the trading card, item data about the item, and market data about the item. The item trading card may be generated with data from inventory 204 collected by an identification module 202, collection module 206, and/or tracking module 210. A previously created item trading card may be identified and accessed from inventory 204 in one example by the item identifier and/or the item trading card identifier. In one example, a new item trading card may be generated by scanning a unique barcode associated with the item or receiving a picture of an item. In another example, the unique barcode may be associated with a vehicle identification number. In yet another example, each of the item identifier and the trading card identifier may include a barcode or quick response (QR) code.

In an operation 706, the identified/accessed, updated, and/or generated item trading card may be shared with another consumer or user. According to one aspect, the item trading card may be shared over a network, including a local area network and/or a wide area network. According to another aspect, the item trading card may be shared over a social network with contacts or nodes of the social network. According to another aspect, the item trading card may be shared over a network by sharing the item identifier associated with the item and/or the item trading card identifier associated with the trading card. According to yet another aspect, the item trading card may be shared between two or more mobile client devices via a Bluetooth standard, an 802.11 standard, a Bump application, or a Flick application.

In process 700B, a user interface is again provided in an operation 752 to generate, access, and/or display an item trading card associated with an item. In one example, a user or consumer at a client device (e.g., client machine 110 or 112) may install or run a user interface application for generating, managing, and/or sharing one or more item trading cards. In another example, an application server, marketplace application, or inventory system may provide a user interface to a client device.

In an operation 754, a new item trading card is generated or a previously created item trading card (partial or complete) may be identified, as previously described above with respect to operation 704, the associated descriptions being fully applicable in operation 754.

In an operation 756, an item trading card may be optionally added to an inventory. In one example, the addition of the item may be performed as described above in connection with the identification module 202, collection module 206, and/or tracking module 210. The item may have a full or partial description at the time it is added.

In an operation 758, additional data about the added item may be collected from one or more sources as described above with respect to collection module 206. In an operation 760, the collected data may be added/updated to the item trading card by storing the information in the inventory 204 or the catalog 208. Operations 758 and 760 may be repeated as additional information is collected or over periods of time.

In an operation 762, market data may optionally be collected for the item from one or more sources as described above with respect to tracking module 210. In an operation 764, the collected market data may be added/updated to the item trading card by storing the information in the inventory 204. Operations 762 and 764 may be repeated as additional information is collected, continuously over time, or periodically over time.

In an operation 766, the identified/accessed, updated, and/or generated item trading card may be shared with another consumer or user. According to one aspect, the item trading card may be shared over a network, including a local area network and/or a wide area network. According to another aspect, the item trading card may be shared over a social network with contacts or nodes of the social network. According to another aspect, the item trading card may be shared over a network by sharing the item identifier associated with the item and/or the item trading card identifier associated with the trading card. According to yet another aspect, the item trading card may be shared between two or more mobile client devices via a Bluetooth standard, an 802.11 standard, a Bump application, or a Flick application.

Figure 8:
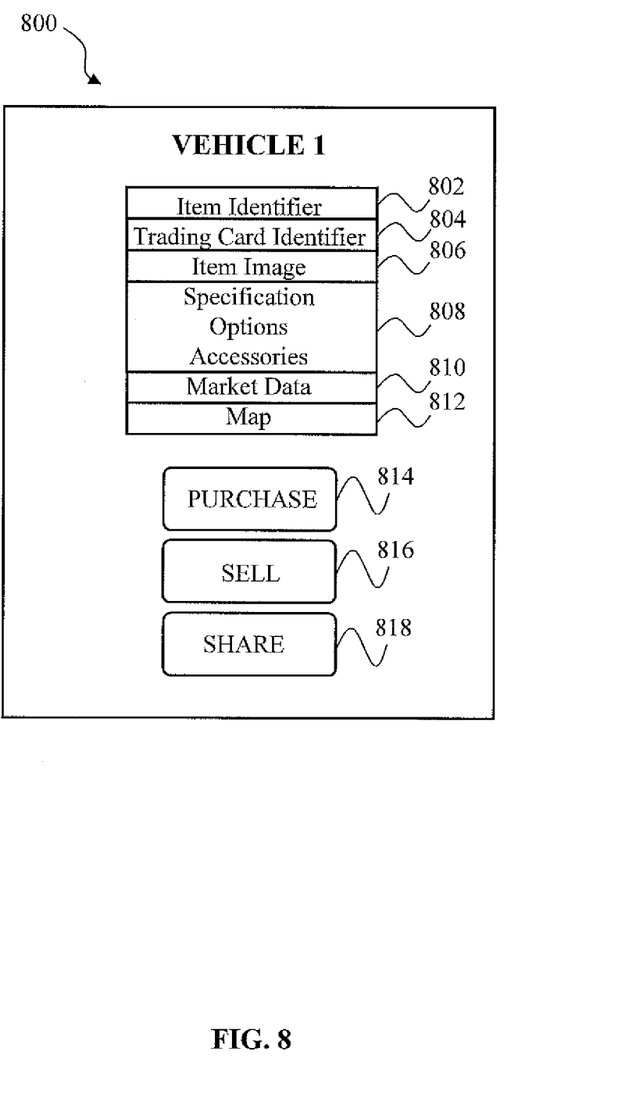
FIG. 8 depicts a portion of an item trading card on an example user interface generated by the inventory system according to an embodiment.

FIG. 8 depicts a portion of an example item trading card 800 on a user interface generated by the inventory system 200. The example item trading card 800 comprises an item identifier 802, a trading card identifier 804, an item image 806, item data 808, item market data 810, and a map 812. Item trading card 800 may further include a purchase interface 814, a sell interface 816, and a share interface 818. Some of the elements listed above for item trading card 800 may be removed and/or a combination of the elements may be altered without departing from the scope of the present disclosure. The item trading card may further include other item descriptions, images, or may link to more detailed information.

In one example, each of the item identifier 802 and the trading card identifier 804 may include a unique barcode or a unique quick response (QR) code. Item image 806 may include any applicable picture file or graphic provided by the consumer, from a catalog, from a network (e.g., the Internet), or from another applicable image source. Item data 808 may include any applicable item data, such as a vehicle specification, options, and accessories for a vehicle item. The trading card 800 may further include market data 810 including a manufacturer's suggested retail price, an expected resale value, best price in a local area, and the like. The expected resale value may be based on recent sales and may be calculated as, for example, an average, median, or mode of recent sale prices. A price trend may be indicated to the user graphically, for example by arrows pointing up, down, and sideways. Other graphics may include graphs, charts, or the like. Notations explaining reasons for price trends may also be included. Map 812 may be provided to show sellers, purchasers, merchants, and the like. In one example, map 812 in conjunction with location technology, such as a Global Positioning System (GPS), may be used to identify nearby sources for parts, service, etc.

Trading card 800 may further include the purchase interface 814 and the sell interface 816 to provide an option to seek to sell or purchase the item. Upon selecting the option to purchase or sell, the item may be listed for purchase or sale by the marketplace applications 120. Share interface 818 provides an option to share the item trading card 800, for example as described above with respect to operations 706 and 766 of FIGS. 7A and 7B, respectively.

Accordingly, in one example, an item trading card may include information about a car that is owned by a consumer or is desired to be purchased by a consumer. Based on a car identifier, associated parts, components, other car data, and car market data may be retrieved and accessed. The user can outfit the car with various parts. When finished, a trading card listing the item and the selected parts may be generated. The trading card may include various performance and mechanical characteristics and data associated with the car, such as the type of engine, tires, accessories, and features (e.g., navigation system, CD changers, etc.). Other data may include make, model, trim, year, color, transmission, horsepower, 0-60 time, photos/videos associated with the car, and history. The user is able to share the trading card with other users (e.g., within a user's social network, a network of item collectors, users who own of have installed the user interface application, or to the general public) or the user may choose to keep the trading card private. The trading card may be traded using various applicable sharing mechanisms (e.g., Bluetooth, wife, Bump, Flick, etc.). The trading card may also be shared using unique QR codes or other barcodes. Information presented on the trading card may also be used to offer the consumer with other items for sale.

Thus, various embodiments of methods and systems to generate and manage inventories of item trading cards have been described. In accordance with one embodiment, a system includes a memory to store an inventory of item trading cards, and a processor to execute: an identification module to add an item trading card to the inventory, the item trading card including an item identifier associated with an item, a collection module to collect item data about the added item, and a tracking module to collect market data about the added item. The system further includes a network interface to share the item trading card over a network.

In accordance with another embodiment, a method includes providing an interface to access an item trading card associated with an item, and generating the item trading card including an item identifier associated with the item, a trading card identifier associated with the trading card, item data about the item, and market data about the item. The method further includes sharing the item trading card.

In accordance with yet another embodiment, a non-transitory computer-readable medium having instructions embodied thereon is presented, the instructions executable by a processor to perform a method to provide an item trading card, the method comprising: providing an interface to access an item trading card associated with an item; generating the item trading card including an item identifier associated with the item, a trading card identifier associated with the trading card, item data about the item, and market data about the item; and sharing the item trading card.

Some embodiments may be used to provide a technical solution to a technical problem of populating records accurately and efficiently to minimize errors caused by user error. Although the present disclosure has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system comprising:
a memory to store an inventory corresponding to a consumer, the inventory comprising a list of items; and
a processor to execute:
an identification module to add an item and an item trading card to the inventory, the item trading card including an item identifier associated with the added item and a trading card identifier associated with the item trading card,
a collection module to collect one or more additional item data about the added item, automatically, from a plurality of sources, and update an item description associated with the item trading card based on the automatically collected additional item data, and
a tracking module to collect plurality of market data about the added item, automatically, from a plurality of sources, and update the item trading card based on the automatically collected market data; and
a network interface to share the item trading card over a network.

2. The system of claim 1, wherein the processor is further to execute an interface module to generate an interface to display the item trading card.

3. The system of claim 2, wherein the interface module is further to provide an option, within the interface, to list the added item of the item trading card for sale or purchase in an online marketplace.

4. The system of claim 1, further comprising another memory to store a catalogue, the catalog including information about the items included in the inventory, wherein the collection module is to access the other memory to retrieve data about the added item.

5. The system of claim 1, wherein the identification module is to add the item trading card based on a purchase of the associated item by a consumer, based on a barcode received from a consumer, or based on a picture received from a consumer.

6. The system of claim 1, wherein the tracking module is to collect market data including sale prices for other instances of the item or market data about similar items.

7. The system of claim 1, wherein the network includes a local area network (LAN), a wide area network (WAN), or a social network.

8. The system of claim 1, wherein the identification module adds an item and an item trading card to the inventory based on a history of transactions that correspond to the consumer.

9. A method comprising:
generating, electronically by a hardware processor, an item trading card for an item including an item identifier associated with the item and a trading card identifier associated with the item trading card;
collecting, electronically by the hardware processor, one or more additional item data and a plurality of market data about the item, automatically, from a plurality of sources;
updating, electronically by the hardware processor, an item description associated with the item trading card based on the automatically collected additional item data;
updating, electronically by the hardware processor, the item trading card based on the automatically collected market data; and
sharing the item trading card, electronically over a network.

10. The method of claim 9, wherein the generating of the item trading card includes scanning a unique barcode associated with the item.

11. The method of claim 10, wherein the unique barcode is associated with a vehicle identification number.

12. The method of claim 9, wherein each of the item identifier and the trading card identifier includes a barcode or quick response (QR) code.

13. The method of claim 9, further comprising sharing the item trading card over a network, including a local area network and/or a wide area network.

14. The method of claim 13, wherein the sharing of the item trading card over the network includes sharing the item trading card over a social network.

15. The method of claim 13, wherein the sharing of the item trading card over the network includes sharing the item trading card identifier associated with the trading card.

16. The method of claim 9, wherein the sharing of the item trading card includes sharing the item trading card between two or more mobile devices via a Bluetooth standard, an 802.11 standard, or a Bump application.

17. The method of claim 9, wherein the collecting of the item data about the item includes collecting vehicle performance specifications and vehicle mechanical specifications.

18. The method of claim 9, wherein the collecting of the market data about the item includes accessing a catalog.

19. The method of claim 9, further comprising providing an option to a consumer to list the item for sale or purchase in an online marketplace within the interface.

20. A non-transitory computer-readable medium having instructions embodied thereon, the instructions executable by a processor to perform a method to provide an item trading card, the method comprising:
generating an item trading card for an item including an item identifier associated with the item and a trading card identifier associated with the item trading card;
collecting one or more additional item data and a plurality of market data about the item, automatically, from a plurality of sources;
updating an item description associated with the item trading card based on the automatically collected additional item data;
updating the item trading card based on the automatically collected market data; and
sharing the item trading card over a network.

* * * * *